United States Patent
Whitby et al.

(10) Patent No.: US 9,139,162 B1
(45) Date of Patent: Sep. 22, 2015

(54) SEAT BELT SAFETY INSERT SYSTEM

(71) Applicants: Bruce Whitby, League City, TX (US);
 Mary Whitby, League City, TX (US)

(72) Inventors: Bruce Whitby, League City, TX (US);
 Mary Whitby, League City, TX (US)

(*) Notice: Subject to any disclaimer, the term of this patent is extended or adjusted under 35 U.S.C. 154(b) by 0 days.

(21) Appl. No.: 14/273,233

(22) Filed: May 8, 2014

(51) Int. Cl.
 *G08B 23/00* (2006.01)
 *B60R 22/48* (2006.01)

(52) U.S. Cl.
 CPC .......... *B60R 22/48* (2013.01); *B60R 2022/4866* (2013.01)

(58) Field of Classification Search
 CPC .......... B60N 2/002; B60N 2/26; B60N 2/265; B60N 2/28; B60N 2/2803; B60N 2/2806; G08B 21/02; G08B 21/0202; G08B 21/0205; G08B 21/0258; G08B 21/22; B60R 22/48; B60R 2202/4866
 USPC ........ 340/573.1, 573.4, 457.1, 539.1, 539.11, 340/539.13, 539.21, 539.23, 539.27
 See application file for complete search history.

(56) References Cited

U.S. PATENT DOCUMENTS

| | | | |
|---|---|---|---|
| 5,949,340 A | 9/1999 | Rossi | |
| 6,922,147 B1* | 7/2005 | Viksnins et al. | 340/573.1 |
| 6,924,742 B2 | 8/2005 | Mesina | |
| 7,466,217 B1 | 12/2008 | Johnson et al. | |
| 7,567,181 B1* | 7/2009 | Davison | 340/573.1 |
| 8,058,983 B1* | 11/2011 | Davisson et al. | 340/457 |
| 8,659,414 B1* | 2/2014 | Schuk | 340/457.1 |
| 8,810,384 B1* | 8/2014 | Bowman | 340/438 |
| 8,816,839 B1* | 8/2014 | Rick | 340/457.1 |
| 2003/0062996 A1* | 4/2003 | Flanagan et al. | 340/573.4 |
| 2003/0122662 A1* | 7/2003 | Quinonez | 340/573.1 |
| 2008/0316043 A1* | 12/2008 | Gomes | 340/686.6 |
| 2013/0033373 A1* | 2/2013 | Thomas | 340/457.1 |

* cited by examiner

*Primary Examiner* — Thomas Mullen
(74) *Attorney, Agent, or Firm* — Crossley Patent Law

(57) ABSTRACT

A seat belt safety insert system with distance and temperature sensitivity in communication with a remote control to warn the remote control holder of excessive distance from and potential danger from heat within a vehicle.

2 Claims, 3 Drawing Sheets

SEAT BELT SAFETY INSERT SYSTEM

CROSS-REFERENCE TO RELATED APPLICATIONS

Not Applicable

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of automobile safety warning devices are known in the prior art. Such devices are often concerned with leaving individuals or animals in a parked automobile and thereby endangering those occupants. Studies show that temperature increases of 20 degrees can occur in a matter of minutes within a parked vehicle. What is needed is a seat belt safety insert system with distance and temperature sensitivity in communication with a remote control to warn the remote control holder of excessive distance from and potential danger from heat within a vehicle.

FIELD OF THE INVENTION

The present invention relates to auto occupant safety, and more particularly, to a seat belt safety insert system with distance and temperature sensitivity to warn a remote holder of potentially dangerous in-auto conditions.

SUMMARY OF THE INVENTION

The general purpose of the present seat belt safety insert system, described subsequently in greater detail, is to provide a seat belt safety insert system which has many novel features that result in a seat belt safety insert system which is not anticipated, rendered obvious, suggested, or even implied by prior art, either alone or in combination thereof.

To accomplish this, the seat belt safety insert system partially comprises a seat belt adaptor. The adaptor comprises a first end spaced apart from a second end. A male member is disposed outwardly from the first end. The male member is configured to insert into an existing seat belt. A female member is disposed within the second end. The female member is configured to removably accept an existing seat belt. The adaptor is therefore configured to insert between existing seat belt male and female devices. A plurality of adaptor components is disposed within the adaptor, the adaptor components are in communication. The adaptor components comprise a first battery pack, a distance and temperature sensor unit, a first alarm, a transmitter, and a first CPU, wherein the transmitter is configured to energize the first alarm and to transmit upon the distance and temperature sensor unit reaching an adjustably set designated temperature.

The system further comprises a remote control device comprising a plurality of remote control device components in communication with each other. The remote control device components comprises a second CPU, a second battery pack, a second alarm, a light, a receiver, and a control button. The control button is configured to activate the remote and the seat belt adaptor. The light flashes intermittently when the remote control device is activated and in communication with the adaptor. The light is configured to continuously illuminate when the remote control device reaches a preset distance from the adaptor to remind a holder of the remote control device that the holder has traveled an inordinate distance from an automobile. The system is not designed to be limited to infant use but rather is also used to remind of aged passengers and even animals that may be engaged with an existing seatbelt via a harness or the like. The remote control device is configured to activate the second alarm when signaled by the adaptor. The adaptor is configured to activate the first alarm and transmit to the remote control device to activate the second alarm upon the distance and temperature sensor unit reaching an adjustable preset temperature.

Thus has been broadly outlined the more important features of the present seat belt safety insert system so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
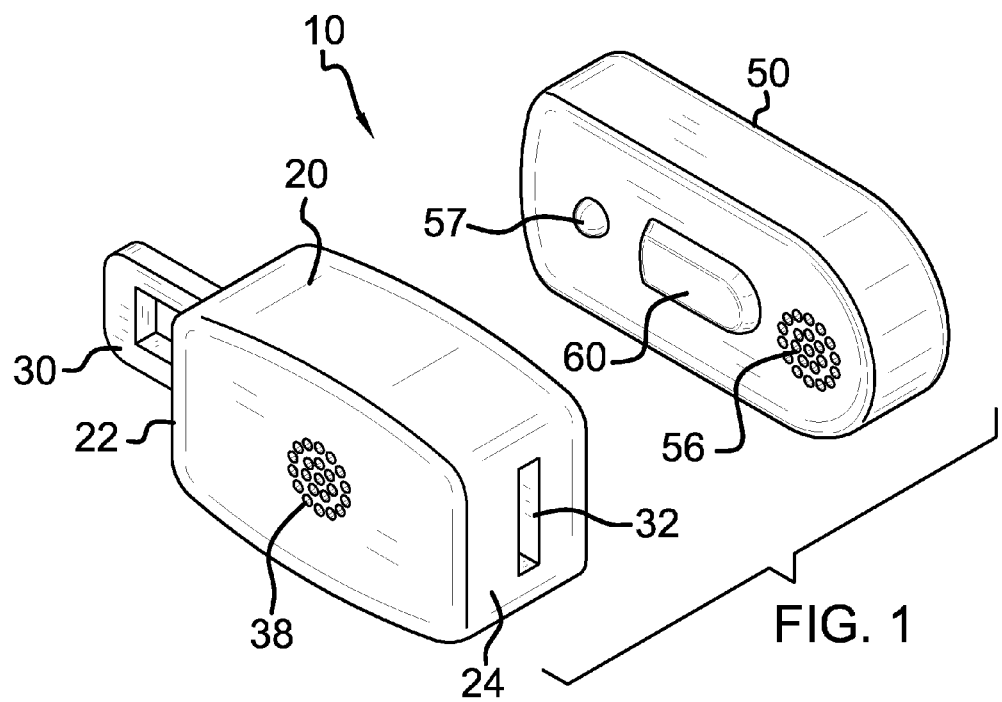
FIG. 1 is a perspective view.
Figure 2:
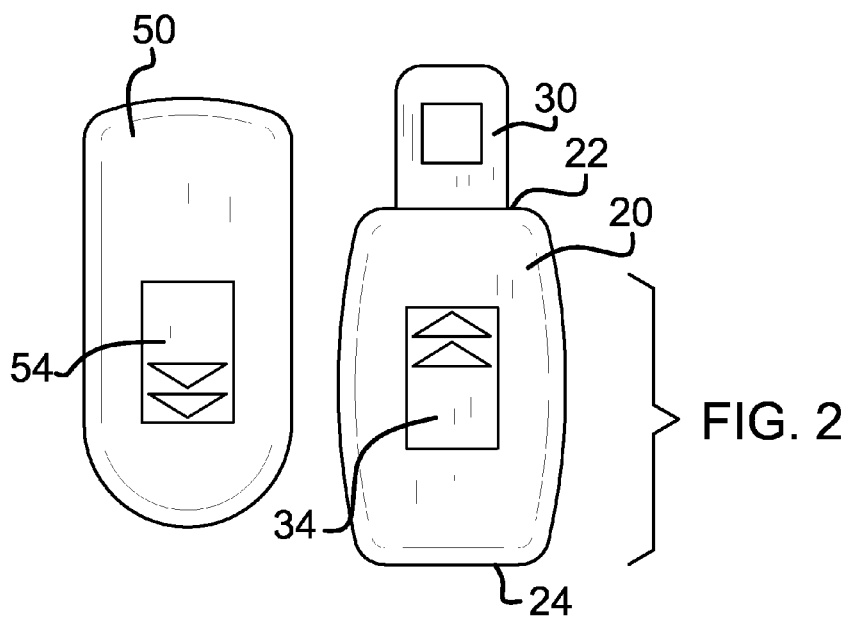
FIG. 2 is a bottom plan view.
Figure 3:
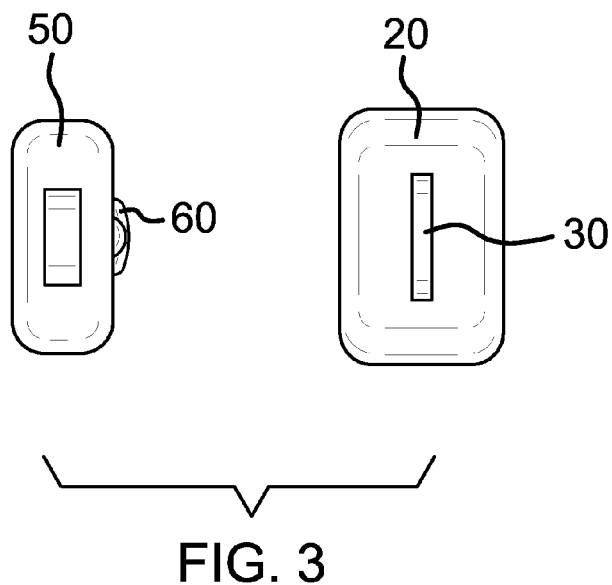
FIG. 3 is a first end view.
Figure 4:
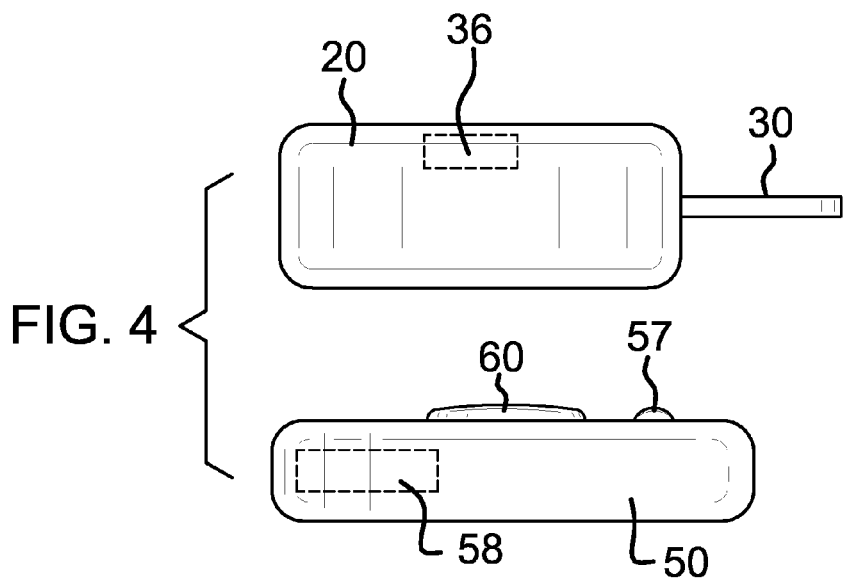
FIG. 4 is a side elevation view.
Figure 5:
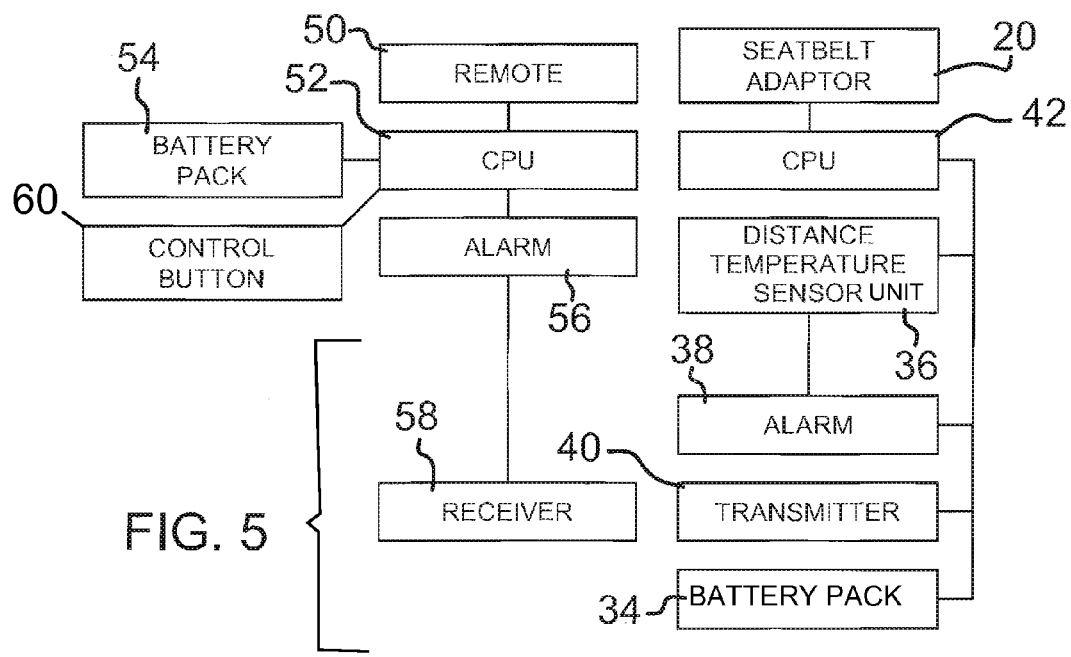
FIG. 5 is a schematic block diagram of components.
Figure 6:
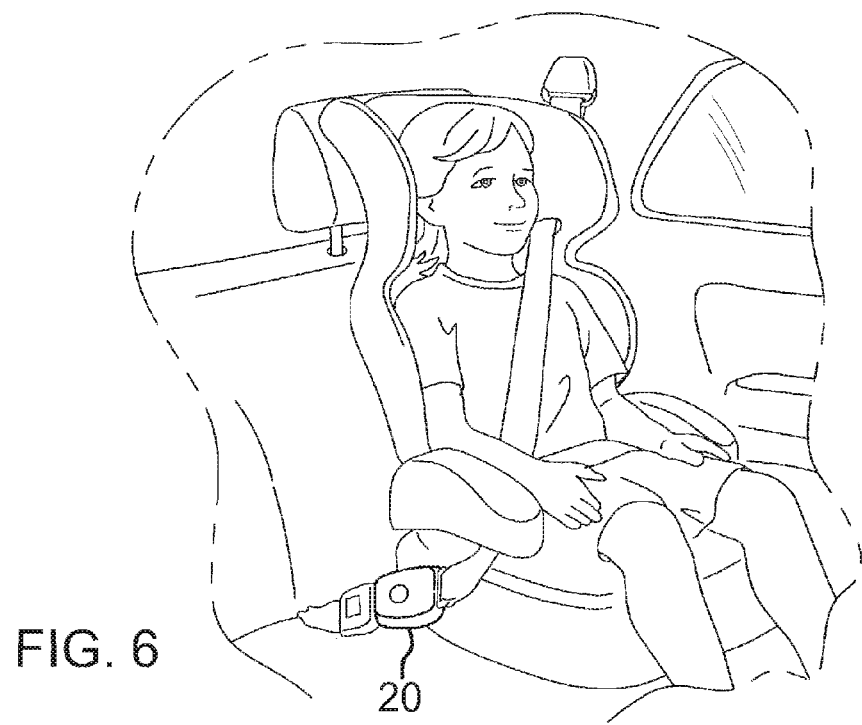
FIG. 6 is an in use view of an adaptor.

With reference now to the drawings, and in particular FIGS. 1 through 6 thereof, an example of the seat belt safety insert system employing the principles and concepts of the present seat belt safety insert system and generally designated by the reference number 10 will be described.

Referring to FIGS. 1 through 6, the seat belt safety insert system 10 is illustrated. The seat belt safety insert system 10 partially comprises a seat belt adaptor 20. The adaptor comprises a first end 22 spaced apart from a second end 24. A male member 30 is disposed outwardly from the first end 22. The male member 30 is configured to insert into an existing seat belt. A female member 32 is disposed within the second end 24. The female member 32 is configured to removably accept an existing seat belt. The adaptor 20 is therefore configured to insert between existing seat belt male and female devices. A plurality of adaptor 20 components is disposed within the adaptor 20. The adaptor 20 components are in communication with each other. The adaptor 20 components comprise a first battery pack 34, a distance and temperature sensor unit 36, a first alarm 38, a transmitter 40, and a first CPU 42, wherein the transmitter 40 is configured to activate the first alarm 38 and to transmit upon the distance and temperature sensor unit 36 reaching a designated temperature.

The system 10 further comprises a remote control device 50 comprising a plurality of remote control device 50 components in communication with each other. The remote control device 50 is in communication with the adaptor 20. The remote control device 50 components comprise a second CPU 52, a second battery pack 54, a second alarm 56, a light 57, a receiver 58, and a control button 60. The control button 60 is configured to activate the remote control device 50 and the adaptor 20. The light is configured to flash intermittently when the remote control device 50 is activated and in communication with the adaptor 50. The light 57 is configured to continuously illuminate when the remote control device 50 reaches a preset distance from the adaptor 20. The remote control device 50 is configured to activate the second alarm 56 when signaled by the adaptor 20 distance and temperature sensor unit 36. The adaptor 20 is configured to activate the first alarm 38 and transmit to the remote control device 50 to activate the second alarm 56 upon the distance and temperature sensor unit 36 reaching an adjustable preset temperature.

What is claimed is:

1. A seat belt safety insert system comprising:
  a seat belt adaptor comprising a first end spaced apart from a second end;
  a male member disposed outwardly from the first end;
  wherein the male member is configured to insert into an existing seat belt;
  a female member disposed within the second end;
  wherein the female member is configured to removably accept the existing seat belt;
  a plurality of adaptor components disposed within the adaptor and in communication with each other, the adaptor components comprising:
    a first CPU;
    a distance and temperature sensor unit;
    a first alarm;
    a transmitter;
    a first battery pack;
  a remote control device comprising a plurality of remote control device components in communication with each other, the remote control device in communication with the adaptor, the remote control device components comprising:
    a second CPU;
    a second battery pack;
    a second alarm;
      a light;
      a receiver; and
      a control button;
  wherein the control button is configured to activate the remote control device and the adaptor;
  wherein the light is configured to flash intermittently when the remote control device is activated and in communication with the adaptor; and
  wherein the light is configured to continuously illuminate and the second alarm is activated when the remote control device reaches a predetermined distance from the adaptor.

2. A seat belt safety insert system comprising:
  a seat belt adaptor comprising a first end spaced apart from a second end;
  a male member disposed outwardly from the first end;
  wherein the male member is configured to insert into an existing seat belt;
  a female member disposed within the second end;
  wherein the female member is configured to removably accept the existing seat belt;
  a plurality of adaptor components disposed within the adaptor and in communication, the adaptor components comprising:
    a first CPU;
    a distance and temperature sensor unit;
    a first alarm;
    a transmitter;
    a first battery pack;
  wherein the adaptor is configured to activate the first alarm upon the distance and temperature sensor unit reaching a designated temperature;
  a remote control device comprising a plurality of remote control device components in communication with each other, the remote control device in communication with the adaptor, the remote control device components comprising:
    a second CPU;
    a second battery pack;
    a second alarm;
    a light;
    a receiver; and
    a control button;
  wherein the control button is configured to activate the remote control device and the adaptor;
  wherein the light is configured to flash intermittently when the remote control device is activated and in communication with the adaptor;
  wherein the light is configured to continuously illuminate and the second alarm is activated when the remote control device reaches a predetermined distance from the adaptor; and
  wherein the adaptor is configured to activate the first alarm and transmit to the remote control unit to activate the second alarm upon the distance and temperature sensor unit reaching an adjustable preset temperature.

* * * * *